United States Patent [19]

Buchanan

[11] 3,942,047
[45] Mar. 2, 1976

[54] MOS DC VOLTAGE BOOSTER CIRCUIT
[75] Inventor: John K. Buchanan, Tempe, Ariz.
[73] Assignee: Motorola, Inc., Chicago, Ill.
[22] Filed: June 3, 1974
[21] Appl. No.: 475,366

[52] U.S. Cl. .............. 307/297; 307/303; 307/304; 321/15
[51] Int. Cl.² ....................................... H02M 3/155
[58] Field of Search ........... 307/296, 297, 304, 303; 321/15

[56] References Cited
UNITED STATES PATENTS
3,808,468  4/1974  Ludlow et al. ................. 307/297 X

*Primary Examiner*—Siegfried H. Grimm
*Attorney, Agent, or Firm*—Harry M. Weiss; Charles R. Hoffman

[57] ABSTRACT

A MOSFET voltage booster circuit generates a stepped up DC voltage from a lower magnitude supply voltage and a periodic input signal. A plurality of such MOSFET voltage booster circuits, which are formed only from components integrated in the MOSFET integrated circuit chip, may be formed on the chip near corresponding sections of circuitry requiring a high DC bias signal. A free-running oscillator circuit may provide the required periodic input signal.

9 Claims, 8 Drawing Figures

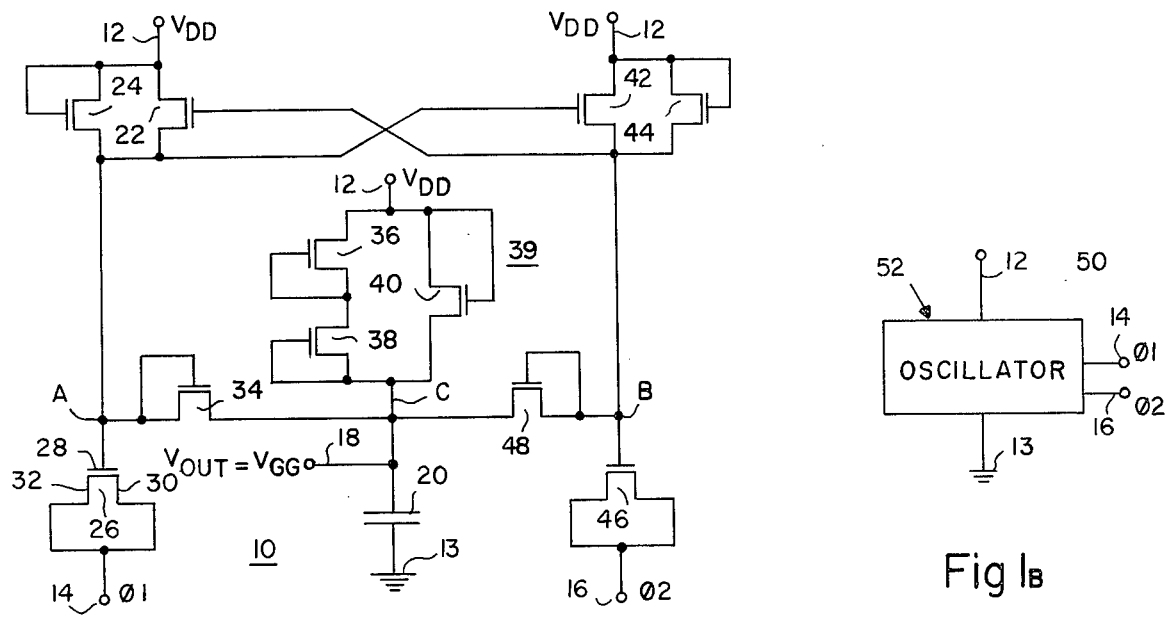
Fig I_A
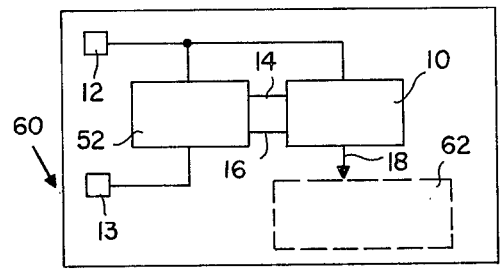
Fig I_B
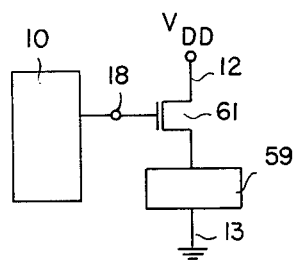
Fig I_C
Fig I_D
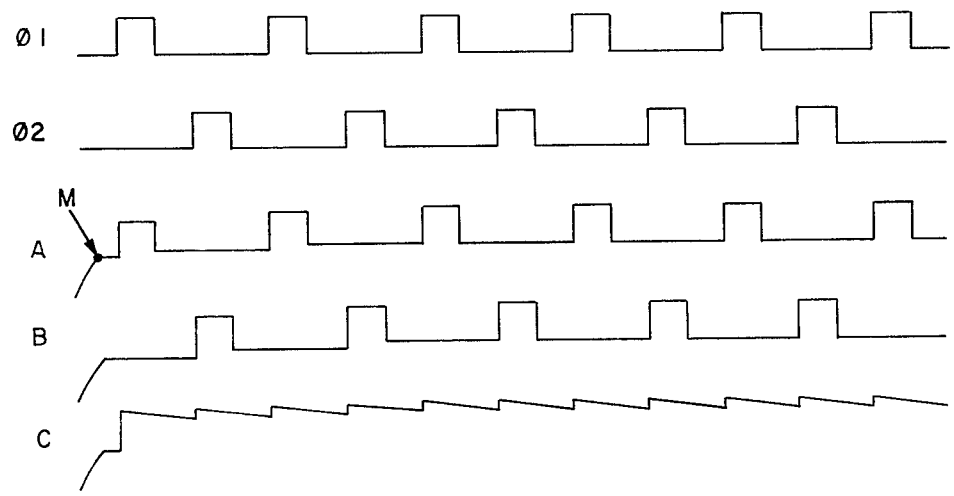
Fig 2

MOS DC VOLTAGE BOOSTER CIRCUIT

BACKGROUND OF THE INVENTION

MOS large scale integrated circuits have become increasingly popular in the electronics market because of their ability to provide high component densities at low cost per function at moderate speeds and relatively low power dissipation. However, for optimum performance, a plurality of relatively high power supply lines, commonly designated VDD and VGG as well as the ground conductor have been required. Improvements in the state-of-the-art MOSFET processing techniques have been developed to provide MOS chips which operate from the same relatively low voltage, for example, 5 volts, as popular bipolar integrated circuit logic families, for example, TLL, etc. However, it has been difficult to obtain the required circuit speeds for MOS LSI circuits at such low power supplies. Further, with the very high component density on MOS LSI integrated circuit chips, a large number of circuit functions per chip are obtainable, and a serious problem exists in providing enough leads and bonding pads for the semiconductor package and chip to provide the necessary signals for operation of the complex logic functions. Further, at such low power supply voltages, variations in the MOS processing parameters, especially the MOS threshold voltage V to become more significant, making far more difficult the design of certain logic circuits on the chip under worst case conditions. Further, at such low power supply voltages, the voltage drops across the long metallization lines on the chip which distribute the supply voltage become significant and make more difficult design of logic elements located distant from the power supply bonding pad. In some cases, bootstrap inverter circuits and drivers have been used to produce high voltage pulses which provide the additional required drive to particular MOSFETs, usually MOSFET load devices, which need to generate a large magnitude signal with a fast rise time. But the variation and the magnitude of such pulses with processing variations has usually been in the opposite sense required for optimum circuit design. Further, race conditions normally associated with digital pulse generating circuitry further compound the problem of getting adequate high voltage signals to particular MOSFETs for the required period of time.

It is an object of the invention to provide an improved voltage booster circuit.

It is a further object of the invention to provide a voltage booster circuit fabricated with metal oxide semiconductor field effect transistors (MOSFETs).

It is a further object of the invention to provide an integrated circuit chip with at least one internal circuit which generates a DC voltage greater in magnitude than any voltage externally applied to the integrated circuit chip.

It is a further object of the invention to provide an integrated circuit chip with a plurality of internal voltage booster circuits which are located so as to distribute the stepped up DC voltage to nearby portions of the circuit requiring such stepped up voltage.

SUMMARY OF THE INVENTION

Briefly described, the invention provides a voltage booster circuit for producing a stepped up voltage at an output node thereof and includes, in one embodiment, a field effect transistor load device coupled between the supply voltage conductor and a capacitor, the opposite node of which is coupled to a periodic signal or clock signal. From the junction between the load field effect transistor and the capacitor is a diodeconnected field effect transistor, the source of which is connected to the output node. In one embodiment of the invention, a voltage regulator circuit is connected to the output node, and includes at least one diode-connected field effect transistor coupled between a power supply and the output node, the source being connected to the output node, and in parallel contains at least one diode-connected field effect transistor coupled in the opposite sense between the output node and the power supply conductor. In another embodiment, a second load field effect transistor and capacitor are coupled in series between the power supply conductor and a second clock signal conductor, and a second diode-connected field effect transistor is coupled between the output node and the junction between the second load field effect transistor and the second capacitor. In another embodiment, a first feedback transistor is coupled in parallel with the first load field effect transistor and has its gate connected to the second junction, and a second feedback field effect transistor is coupled in parallel with the second load field effect transistor and has its gate connected to the first junction. In another embodiment of the invention, the above-described voltage boosters are provided on an integrated circuit chip to provide a stepped up bias voltage to a portion of the circuitry on the chip. In another embodiment, a freerunning oscillator on the chip provides the required periodic clock input signal. In another embodiment, back-to-back bootstrap inverters have a capacitor terminal of the feedback capacitance thereof connected to a diodeconnected field effect transistor which charges the output capacitance associated with the output node. This reduces the capacitive loading on the clock signals.

BRIEF DESCRIPTION OF THE DRAWINGS

FIG. 1A is a schematic diagram of a preferred embodiment of the invention.

FIG. 1B is a clock diagram representing a free-running oscillator which generates the periodic signals required by the embodiment of FIG. 1A.

FIG. 1C is a diagram illustrating a typical application of the voltage booster circuit of FIG. 1A.

FIG. 1D is a diagram representative of an integrated circuit chip incorporating the oscillator of FIG. 1B and the voltage booster circuit of FIG. 1A to provide a stepped up voltage on the integrated circuit chip.

FIG. 2 is a timing diagram useful in describing the operation of the embodiment of FIG. 1A.

DESCRIPTION OF THE INVENTION

Figure 3:
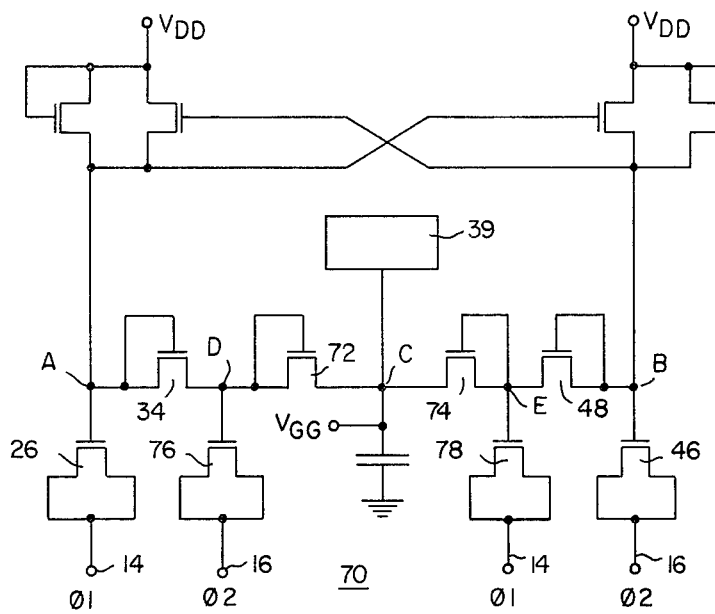
FIG. 3 is a schematic diagram of another embodiment of the invention which produces a stepped up voltage higher in magnitude than the embodiment of FIG. 1A.

FIG. 1A is a schematic diagram of a preferred embodiment of the invention. In FIG. 1A, voltage booster circuit 10 includes a first section including capacitor 26 coupled between input signal conductor 14 and node A and MOSFETs (metal oxide semi-conductor field effect transistors) 22 and 24 coupled between supply voltage conductor 12 and node A, and diode-connected MOSFET 34 coupled between node A and output node C. (A diode-connected MOSFET is one in which the gate and drain electrodes are connected together). Output node C is connected to output conductor 18. An output capacitor 20 represents a capacitance associated with conductor 18 and is coupled between conductor 18 and ground supply conductor 13.

The MOSFETs described herein may be, in a preferred embodiment, N-channel MOSFETs. A supply voltage commonly designated VDD, may be applied to conductor 12, and may be approximately 5 volts. It is frequently required that a bias voltage greater in magnitude than VDD be available to certain portions of an MOS LSI (large scale integrated) circuit and a separate bonding pad is commonly provided on an integrated circuit chip to allow such a voltage, commonly designated VGG, to be distributed on the semiconductor chip where it is needed. However, this requires an extra pin on the package and an extra bonding pad which could advantageously be used to provide a functional input or output signal to the circuit if the VGG bias voltage could be generated internally.

If a periodic signal 01 is applied to clock signal conductor 14, a boosted, rectified signal will appear at output conductor 18, as will be described hereinafter with reference to the timing diagram of FIG. 2. However, it is important to note that a boosted, rectified signal can be achieved only with the elements thus far described, exclusive of MOSFET 22. However, parasitic leakage currents may result in undesired "ripple" on the output voltage on node C, and variations in processing parameters may result in an output voltage which varies in the wrong direction as a function of such processing parameters. The amount of ripple can be decreased, a desirable amount of regulation achieved, and a higher magnitude of output voltage may be accomplished by addition of the components next to be described.

A regulating circuit 39 is coupled between output node C and conductor 12 in FIG. 1A, and includes diode-connected MOSFET 40 having its gate and drain connected to conductor 12 and its source connected to output node C. Regulating circuit 39 also includes diode-connected MOSFETs 36 and 38 connected in series between conductor 12 and output node C, the source of MOSFET 36 being connected to conductor 12 and the gate and drain thereof connected to the source of MOSFET 38, the gate and drain of the latter being connected to output node C. As is explained hereinafter, additional diode-connected MOSFETs may be connected in series with MOSFETs 36 and 38 to achieve the type of regulation desired.

A second section of voltage booster circuit 10, symmetrical to the first section, includes MOSFETs 42 and 44 coupled between supply voltage conductor 12 and node B, and also includes diode-connected MOSFET 48 coupled between node B and output node C and further includes capacitor 46 coupled between node B and clock signal conductor 16. Capacitors 26 and 46 may be MOS enhancement capacitors, as schematically illustrated in FIG. 1A. An enhancement capacitor consists of a gate conductor, such as conductor 28, overlying a thin gate oxide layer, which in turn overlies a channel region. The gate conductor overlaps a source region 32 and a drain region 30 which are separated by the channel region. The source and drain regions can be shorted together as shown to form one terminal of the capacitor while the gate electrode forms the other terminal. The main advantage to using enhancement capacitors is their compatibility with conventional MOS manufacturing processes.

Utilization of the symmetrical circuit configuration as shown in FIG. 1A and use of a phase-separated input signals 01 and 02 allows advantageous use of the illustrated cross-coupling technique between MOSFETs 22 and 42, which are referred to herein as feedback devices. The gate of MOSFET 22 is connected to node B and the gate of MOSFET 42 is connected to node A. Those skilled in the art will recognize that in the absence of MOSFETs 22 and 42, load MOSFETs 24 and 44, respectively, are capable of charging nodes A and B, respectively, only to the voltage which is a threshold voltage drop less in magnitude than VDD. However, as explained subsequently herein, feedback MOSFETs 22 and 42 permit nodes A and B, respectively, to be charged all the way to VDD volts.

The operation of the embodiment of FIG. 1A is explained with reference to FIG. 2; the operation of additional embodiments subsequently described herein is in essential respects entirely similar. The input signals 01 and 02 of FIG. 2 may be applied to clock signal conductors 14 and 16, respectively, and as shown, are non-overlapping signals. Waveform A appears at node A of FIG. 1A. Initially, if node A is at zero volts, node A is charged up through MOSFET 24 to VDD −Vth volts, where Vth is the threshold voltage of MOSFET 24; this transition is indicated by point M on waveform A. When the first $\phi 1$ pulse occurs, the charge on capacitor 26 tends to cause the voltage across capacitor 26 to be constant during the leading edge of the first $\phi 1$ pulse. This causes the voltage at node A to be boosted. The charge on capacitor 26 is redistributed between the parasitic capacitance of node A (not shown) and capacitor 20 through unidirectional diode-connected MOSFET 34, thereby causing node C to be further charged up. The waveform at node C is shown by waveform C of FIG. 2. When the initial pulse of signal 01 disappears, node A falls back to VDD −Vth volts, and is maintained at that level by MOSFET 24, which charges enhancement capacitor 26 up again. However, node C remains essentially at the voltage it was charged up to, since diode-connected MOSFET 34 prevents any loss of charge on capacitor 20 to node A. When the first 02 pulse occurs, the waveform B, which appears at node B, responds in an entirely similar fashion, further charging up output capacitor 20. The resulting waveform on output node C, which is at the same potential as output conductor 18 is shown in FIG. 2 as waveform C. The slight ripple effect on waveform C would occur if any parasitic leakage currents existed which would tend to discharge the potential at output node C between clock pulses. Of course, there is no requirement that the relationship between clock signals 01 and 02 be as illustrated in FIG. 2. In fact, they may be in phase or at different frequencies, and overlap. But if overlapping clock pulses are used, MOSFETs 22 and 42 must be eliminated. The intermediate levels of waveform A (and B), as previously mentioned, are VDD −Vth volts in the absense of MOSFETs 22 and 42. However, if node A is at VDD −Vth volts, and 02 pulse occurs and boosts the voltage at node B to approximately VDD −Vth plus 02 volts, MOSFET 22 will be sufficiently overdriven to further charge node A up to VDD volts. Similarly, the intermediate level of node waveform B is boosted to VDD volts by the action of MOSFET 42 when a 01 pulse occurs. Therefore, the boosted output voltage $V_{OUT}$ at output node C, in absence of clamping regulator circuit 39, is then equal to the peak voltages at nodes A and B. That is, the voltage at output node C is equal to $V_{DD}$ plus the magnitude of the 01 and 02 (assuming they are of the same magnitude) minus $V_{th}$, the threshold voltage of MOSFETs 34 and 48. In other words, the boosted output voltage $V_{OUT}$ is given by the equation $V_{OUT} = V_{DD} + /\phi/ - V_{th}$, where $/\phi/$ is the magnitude of 01 and 02.

The operation of the regulator circuit 39 acts to limit the voltage at output node C in two ways. First, MOSFET 40 prevents $V_{OUT}$ from falling below VDD −Vth volts. Secondly, MOSFETs 36 and 38 prevent $V_{OUT}$ from being boosted to more than VDD plus 2 Vth volts. Of course, additional MOSFETs may be placed in series with either MOSFETs 36 or 38 or MOSFET 40 to provide the desired limits. This regulating scheme provides a great advantage in worst case design of MOS circuits in that the VGG bias voltage required for biasing load devices of MOS logic gates and inverters and the like is preferably regulated in such a way that for large MOS threshold voltages VGG is large in magnitude, while for small MOS thresholds VGG is relatively less in magnitude. For a more complete discussion of the considerations of worst case design conditions for MOSFET load devices, see copending application, Ser. No. 475,376, by the same inventor and filed on even date herewith. FIG. 1c schematically depicts the arrangement thus suggested, in which voltage booster circuit 10 has its output terminal 18 connected to the gate of MOSFET 61, which is the load device of an MOS logic gate including MOSFET 61 and additional MOSFET circuitry 59 coupled between the source of MOSFET 61 and ground conductor 13. Improved power dissipation, circuit speed, and noise margin performance results from the suggested combination, wherein regulator 10 is the device shown in FIG. 1A including the regulator 39.

As previously suggested, the clocking input signals 01 and 02 do not have to be square wave signals as in FIG. 2, but rather may be signals generated by an oscillator coupled between voltage supply conductor 12 and ground conductor 13. As shown in FIG. 1D, free-running oscillator 52 may be provided on integrated circuit chip 60, which may in turn drive voltage booster circuit 10, as in FIG. 1A, which in turn provides a bias voltage which is distributed to various load devices and the like in MOSFET circuitry on a portion 62 of integrated circuit chip 60.

The following table lists typical values for the devices in FIG. 1A which have been used in a successful implementation of the circuit.

| MOSFET | CHANNEL WIDTH | CHANNEL LENGTH (Mils) |
|---|---|---|
| | (Mils) | |
| 22 | 1.0 | .3 |
| 24 | 1.0 | .3 |
| 34 | 1.0 | .3 |
| 36, 38, 40 | 1.0 | .3 |

| MOSFET | CHANNEL WIDTH | CHANNEL LENGTH (Mils) |
|---|---|---|
| | (Mils) | |
| 48 | 1.0 | .3 |
| 42, 44 | 1.0 | .3 |

Enhanced capacitors 26 and 46 may have an area of approximately 12 square mils.

FIG. 3 schematically depicts another embodiment of the invention which is entirely similar in operation to that of FIG. 1A, and where applicable the same reference numerals have been used. It differs from the embodiment of FIG. 1A mainly in the addition of diode-connected MOSFETs 72 and 74 coupled, respectively, between the source of MOSFET 34 and node C and the source of MOSFET 48 and node C. Further, enhanced capacitor 76 has been coupled between the source of MOSFET 34 and clock signal conductor 16, and enhancement capacitor 78 has been coupled between the source of MOSFET 48 and clock signal conductor 14. In this embodiment, the intermediate level at waveform A is boosted by the action of a 01 pulse and enhanced capacitor 26 so that the charge on capacitor 26 is redistributed through MOSFET 34 and is trapped on node D. If the magnitude of 01 is approximately equal to VDD, the magnitude of the DC voltage on node D is approximately twice that of the intermediate level at node A. The currents of a 02 pulse further boosts the DC voltage at node D by the action of capacitor 76, as charges distributed through MOSFET 72 to node C thus, the voltage of node C is approximately equal to VDD plus the magnitude of 01 plus magnitude of 02 plus the magnitude of 02 minus 2 Vth.

Figure 4:
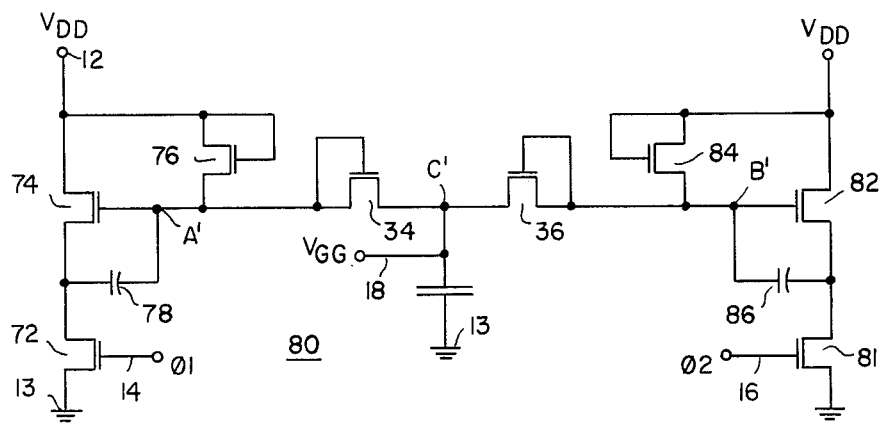
FIG. 4 is a schematic diagram of an alternative embodiment of the invention which produces less capacitive loading on the clock signal lines than the embodiments of FIG. 1A and FIG. 3.

The embodiment of FIG. 4 illustrates a voltage booster circuit in which the capacitive loading on clock signal conductors 14 and 16 may be reduced somewhat. The circuit includes a first MOS bootstrap inverter circuit including MOSFETs 74, 76, 72, and feedback capacitor 78. The voltage at A′ has an intermediate level of approximately VDD −Vvolts, and is boosted to approximately twice this value when MOSFET 72 is off at a combined action of feedback capacitor 78 and the pullup action of MOSFET 74. This voltage diminished by the threshold voltage of MOSFET 34 appears as a DC voltage trapped on node C′. The symmetrically connected bootstrap inverter including the MOSFETs 82, 84, and 81 and feedback capacitor 86 and diode-connected MOSFET 36 provide increased efficiency by reducing the ripple voltage magnitude if substantial leakage currents at node C exists. The gate capacitance of MOSFETSs 72 and 81 can be substantially less than the capacitance of enhanced capacitors 26 and 46 of FIG. 1A, so that the capacitive loading to be charged up by the signals 01 and 02 is substantially reduced. In some cases this may offer advantages.

Figure 5:
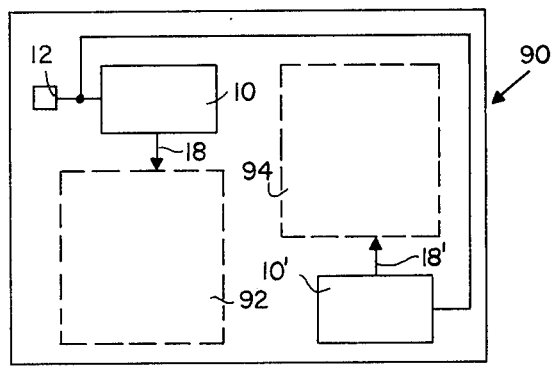
FIG. 5 is a diagram representative of an integrated circuit chip having a plurality of voltage booster circuits as in FIGS. 1A, 3, or 4 which generate separate stepped up voltages which are distributed to separate appropriate portions of circuitry on the integrated circuit chip.

FIG. 5 illustrates an integrated circuit chip 90 which includes several voltage booster circuits 10 and 10′, which may be any of the voltage booster circuits described herein. In FIG. 5, voltage booster circuit 10 and 10′ are coupled between supply voltage conductor 12 and the ground conductor 13 (not shown in FIG. 5). The output voltages VGG and VGG′ appear, respectively, at output nodes 18 and 18′ and independently supply a bias voltage to MOS circuits 92 and 94, respectively, on different portions of the surface of integrated chip 90. As mentioned previously, this scheme of providing a plurality of voltage boosters where required on an integrated circuit chip makes an additional bonding pad and package lead available for signal processing purposes, and allows provision of boosted input voltages of different magnitudes to suit different requirements on the chip, and provides an independent degree of voltage regulation for each which, as described earlier, may offer substantial design advantages in accomplishing optimum worst case circuit design with respect to manufacturing processing parameters such as MOS device threshold voltage.

I claim:

1. A voltage booster circuit coupled to a supply voltage conductor including a first MOSFET coupled between said supply voltage conductor and a first node for charging capacitance associated with the first node, a capacitor coupled between the first node and a first clock signal conductor, and a first diode-connected MOSFET coupled between the first node and a second node, the voltage booster circuit comprising:

a second diode-connected MOSFET having its gate and drain coupled to said supply voltage conductor and its source coupled to said second node, and third and fourth diode-connected MOSFETS coupled in series between said second node and said supply voltage conductor, the source of said fourth diode-connected MOSFET being coupled to said supply voltage conductor, the gate and the drain of said third diode-connected MOSFET being coupled to said second node.

2. A voltage booster circuit, coupled to a supply voltage conductor, for producing a stepped up voltage comprising:

first field effect transistor load means coupled between said supply voltage conductor and a first node for charging capacitance associated with said first node;

capacitive voltage boosting means coupled to said first node and a first clock signal conductor for boosting a voltage on said first node;

diode-connected field effect transistor circuit means coupled between said first node and a second node for transferring charge from said first node to said second node to charge up the capacitance associated with said second node;

second field effect transistor load means for charging a third node coupled between said supply voltage conductor and said third node;

second capacitive voltage boosting means for boosting a voltage on said third node coupled between a second clock signal conductor and said third node; and second diode-connected field effect transistor circuit means for transferring charge from said third node to said second node coupled between said third node and said second node.

3. The voltage booster circuit as recited in claim 2 further including first field effect transistor feedback load means for charging the voltage on said first node to the voltage on said supply voltage conductor means coupled between said supply voltage conductor means and said first node and also coupled to said third node and being responsive to the voltage on said third node, and second field effect transistor feedback load means for charging the voltage on said third node to the voltage on said supply voltage conductor means coupled between said supply voltage conductor means and said third node and also coupled to said first node and being responsive to the voltage on said first node.

4. A voltage booster circuit for producing a stepped up voltage at an output voltage node comprising:

first MOSFET load means for charging a first node coupled between supply voltage conductor means and said first node;

second MOSFET load means for charging a second node coupled between said supply voltage conductor means and said second node;

a first diode-connected MOSFET transistor coupled between said first node and said output voltage node;

a second diode-connected MOSFET transistor coupled between said second node and said output voltage node; and first and second capacitors coupled, respectively, between said first node and a first clock signal conductor and said second node and a second clock signal conductor.

5. The voltage booster circuit as recited in claim 4 further including MOSFET regulator clamping circuit means coupled to said output voltage node for regulating the voltage at said output voltage node.

6. An integrated chip including at least one voltage booster circuit as recited in claim 1 coupled to supply voltage conductor means and distributing a stepped up voltage to a first portion of said integrated circuit chip.

7. The integrated circuit chip as recited in claim 6 further including another said voltage booster circuit coupled to said supply voltage conductor means for producing a second stepped up voltage to a second portion of said integrated circuit chip.

8. A voltage booster circuit as recited in claim 1 wherein said capacitor is an enhancement capacitor having its gate electrode coupled to said first node.

9. A voltage booster circuit for producing a stepped up voltage at an output voltage node comprising:

a load MOSFET coupled between supply voltage conductor means and a first node;

a second diode-connected MOSFET coupled between said supply voltage conductor means and the gate of said load MOSFET;

a bootstrap capacitor coupled between said first node and the gate of said load MOSFET:

a switching MOSFET coupled between said supply voltage conductor means and said first node having its gate coupled to clock signal conductor means;

a second diode-connected MOSFET coupled between the gate of said load MOSFET and said output voltage node.

* * * * *